(12) United States Patent
Yoshii et al.

(10) Patent No.: US 8,068,241 B2
(45) Date of Patent: Nov. 29, 2011

(54) DATA PROCESSING APPARATUS, METHOD AND COMPUTER PROGRAM PRODUCT FOR PASSING DATA AMONG PLURAL USERS WITH DIFFERENT PROCESSING ASSOCIATED WITH DIFFERENT USERS IN THE SAME GROUP

(75) Inventors: Masayuki Yoshii, Sakai (JP); Takeshi Morikawa, Takarazuka (JP); Kei Shigehisa, Amagasaki (JP); Nobuo Kamei, Amagasaki (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1001 days.

(21) Appl. No.: 11/987,648

(22) Filed: Dec. 3, 2007

(65) Prior Publication Data

US 2008/0158598 A1 Jul. 3, 2008

(30) Foreign Application Priority Data

Dec. 28, 2006 (JP) .................................. 2006-354050

(51) Int. Cl.
*H04N 1/21* (2006.01)
*H04N 1/32* (2006.01)
*G06F 15/16* (2006.01)

(52) U.S. Cl. ...... 358/1.13; 358/1.15; 358/402; 358/404; 358/407

(58) Field of Classification Search .................. 358/1.13, 358/1.15, 402, 407, 434, 440, 444, 468; 709/218, 709/229; 379/100.08, 100.09, 100.12
See application file for complete search history.

(56) References Cited

U.S. PATENT DOCUMENTS

| | | | | |
|---|---|---|---|---|
| 5,696,900 A | * | 12/1997 | Nishigaya et al. | 709/229 |
| 6,530,083 B1 | * | 3/2003 | Liebenow | 725/46 |
| 6,757,531 B1 | * | 6/2004 | Haaramo et al. | 455/414.1 |
| 7,436,552 B2 | * | 10/2008 | Nozato | 358/1.13 |
| 2005/0144189 A1 | * | 6/2005 | Edwards et al. | 707/102 |
| 2007/0013942 A1 | * | 1/2007 | Ozawa et al. | 358/1.15 |
| 2007/0047006 A1 | * | 3/2007 | Sakai | 358/1.15 |
| 2008/0074689 A1 | * | 3/2008 | Yamada et al. | 358/1.13 |
| 2008/0218798 A1 | * | 9/2008 | Shigehisa et al. | 358/1.16 |
| 2011/0063653 A1 | * | 3/2011 | Hinaga | 358/1.16 |

FOREIGN PATENT DOCUMENTS

| | | |
|---|---|---|
| JP | 08-125773 | 5/1996 |
| JP | 2000-295403 A | 10/2000 |
| JP | 2002-033862 | 1/2002 |
| JP | 2002-135602 | 5/2002 |
| JP | 2003-078737 | 3/2003 |

OTHER PUBLICATIONS

Notice of Ground of Rejection in JP 2006-354050 dated Dec. 16, 2008, and an English Translation thereof.

* cited by examiner

*Primary Examiner* — Scott A Rogers
(74) *Attorney, Agent, or Firm* — Buchanan Ingersoll & Rooney PC

(57) ABSTRACT

In order to process data by a plurality of processing methods defined for each of a plurality of users with a simple operation, MFP includes a HDD having a group BOX for storing data, related with at least two users, and creates a group table which associates at least two data processing methods respectively corresponding to at least two users with the group BOX. When data is stored into the group BOX, the stored data is processed according to each of at least two data processing methods associated with the group BOX.

15 Claims, 8 Drawing Sheets

FIG. 6A  USER TABLE OF MFP 100

| NUMBER | USER IDENTIFICATION INFORMATION | PASSWORD | BOX IDENTIFICATION INFORMATION | PROCESSING METHOD | |
|---|---|---|---|---|---|
| 1 | DAVID | xxx | 001 | MAIL RECEPTION | david@aa.com |

FIG. 6B  USER TABLE OF MFP 100A

| NUMBER | USER IDENTIFICATION INFORMATION | PASSWORD | BOX IDENTIFICATION INFORMATION | PROCESSING METHOD | |
|---|---|---|---|---|---|
| 1 | JULIE | xxxx | 001 | FAX RECEPTION | 03-3333-3333 |

FIG. 6C  USER TABLE OF MFP 100B

| NUMBER | USER IDENTIFICATION INFORMATION | PASSWORD | BOX IDENTIFICATION INFORMATION | PROCESSING METHOD | |
|---|---|---|---|---|---|
| 1 | TED | xxxxx | 001 | FTP RECEPTION | URL=www.aaa.bb.cc. |

FIG. 6D  USER TABLE OF MFP 100C

| NUMBER | USER IDENTIFICATION INFORMATION | PASSWORD | BOX IDENTIFICATION INFORMATION | PROCESSING METHOD | |
|---|---|---|---|---|---|
| 1 | MICHAEL | xxxxx | 001 | PRINT | MFP-2 |
| 2 | SUSAN | xxxxxx | 002 | MAIL RECEPTION | susan@aa.com |

GROUP TABLE

| NUMBER | USER IDENTIFICATION INFORMATION | PROCESSING METHOD | |
|---|---|---|---|
| 1 | DAVID | MAIL RECEPTION | david@aa.com |
| 2 | JULIE | FAX RECEPTION | 03-3333-3333 |
| 3 | TED | FTP RECEPTION | URL=www.aaa.bb.cc |
| 4 | MICHAEL | PRINT | MFP-2 |
| 5 | SUSAN | MAIL RECEPTION | susan@aa.com |

DATA PROCESSING APPARATUS, METHOD AND COMPUTER PROGRAM PRODUCT FOR PASSING DATA AMONG PLURAL USERS WITH DIFFERENT PROCESSING ASSOCIATED WITH DIFFERENT USERS IN THE SAME GROUP

This application is based on Japanese Patent Application No. 2006-354050 filed with Japan Patent Office on Dec. 28, 2006, the entire content of which is hereby incorporated by reference.

BACKGROUND OF THE INVENTION

1. Field of the Invention

The present invention relates to a data processing apparatus, a data processing method and a data processing program embodied on a computer readable medium, and more particularly to a data processing apparatus suitable for passing data among a plurality of users, a data processing method and a data processing program embodied on a computer readable medium.

2. Description of the Related Art

Conventionally, one data can be transmitted to a plurality of destinations using a mailing list in emails or using a broadcast transmission function in fax transmission. In this manner, a technique is known in which one data is transmitted to a plurality of destinations in a single transmission method.

However, unfortunately, a transmission method to transmit data is determined by a sender user and cannot be determined by a recipient user. In particular, the technique as described above is not adapted to the case where a plurality of destination users desire respective different data transmission methods. A user who receives data may desire reception not via email but via facsimile or may desire reception not via facsimile but via email. Furthermore, the user may desire reception with a file transfer function such as FTP.

Japanese Laid-Open Patent Publication No. 2000-295403 discloses a network facsimile apparatus including a notification destination table holding delivery destination information which can be received at the time of facsimile reception from a public network and mail addresses on another network in association with each other, and control means for transmitting by email a reception notification to a mail address associated with the delivery destination information by the notification destination table, when facsimile data and delivery destination information are received from the public network.

However, in the conventional network facsimile apparatus, although the received facsimile data can be transmitted by email, data different from facsimile data cannot be received and data cannot be transmitted in a transmission method other than email. Therefore, the user's demand for reception in a transmission method other than email cannot be satisfied.

SUMMARY OF THE INVENTION

The present invention is made to solve the aforementioned problem. An object of the present invention is to provide a data processing apparatus capable of processing data in a plurality of processing methods defined for each of a plurality of users, with a simple operation.

Another object of the present invention is to provide a data processing method and a data processing program embodied on a computer readable medium allowing data to be processed in a plurality of processing methods defined for each of a plurality of users, with a simple operation.

In order to achieve the aforementioned object, in accordance with an aspect of the present invention, a data processing apparatus includes: a data storage portion having a group storage region for storing data, which is related with at least two users; a group association portion to associate at least two data processing methods respectively corresponding to the at least two users with the group storage region; and a group processing portion to process data according to each of the at least two data processing methods associated with the group storage region, when the data is stored into the group storage region.

According to this aspect, a data processing apparatus can be provided which is capable of processing data by a plurality of processing methods defined for each of a plurality of users with a simple operation.

In accordance with another aspect of the present invention, a data processing method is performed in a computer including a data storage portion having a group storage region for storing data, which is related with at least two users. The method includes the steps of: associating at least two data processing methods respectively corresponding to the at least two users with the group storage region; and when data is stored into the group storage region, processing the stored data according to each of the at least two data processing methods associated with the storage region.

According to this aspect, a data processing method can be provided which allows data to be processed by a plurality of processing methods defined for each of a plurality of users with a simple operation.

In accordance with a further aspect of the present invention, a data processing program embodied on a computer readable medium is executed by a computer including a data storage portion having a group storage region for storing data, which is related with at least two users. The program causes the computer to execute the steps of associating at least two data processing methods respectively corresponding to the at least two users with the group storage region; and when data is stored into the group storage region, processing the stored data according to each of the at least two data processing methods associated with the storage region.

According to this aspect, a data processing program embodied on a computer readable medium can be provided which allows data to be processed by a plurality of processing methods defined for each of a plurality of users with a simple operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A-FIG. 6D show exemplary user tables.

DESCRIPTION OF THE PREFERRED EMBODIMENTS

Figure 1:
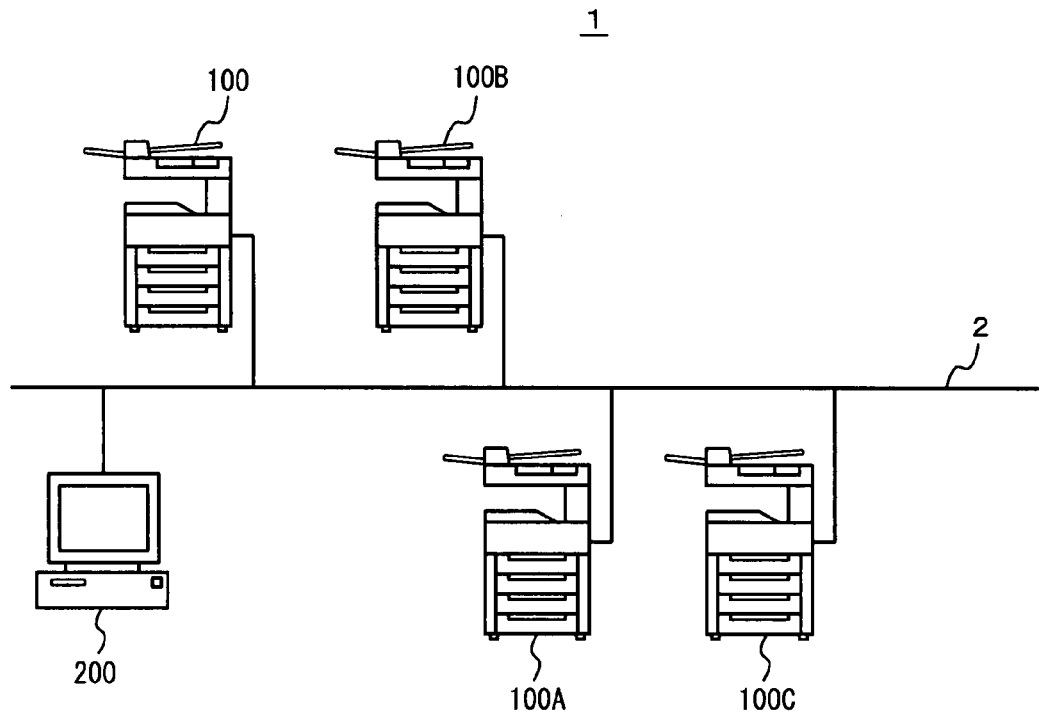
FIG. 1 is an overall schematic diagram showing a data processing system in an embodiment of the present invention.

An embodiment of the present invention will be described below with reference to the drawings. In the following description, the same or corresponding parts are denoted by the same reference characters. Their names and functions are also the same. Thus, a detailed description thereof will not be repeated.

FIG. 1 is an overall schematic diagram showing a data processing system according to an embodiment of the present invention. With reference to FIG. 1, a data processing system 1 includes multi function peripherals (referred to as "MFP" below) 100, 100A, 100B, and 100C and a personal computer (referred to as "PC" below) 200, each connected to a network 2. PC 200 is a general computer. The configuration and function thereof are well known and therefore a description thereof will not be repeated here. The configuration and the function of MFP 100, 100A, 100B, and 100C are the same, and therefore MFP 100 will be described here as an example unless otherwise noted.

MFP (Multi Function Peripheral) 100 is a data processing apparatus, which includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in this embodiment, MFP 100 can be replaced by any other apparatus, such as a scanner, an image forming apparatus, a facsimile, a personal computer creating data, and the like insofar as the data processing function is equipped.

Network 2 is a local area network (LAN), whether wired or wireless. In addition, network 2 is not limited to a LAN and can be a wide area network (WAN) such as the Internet, a network using a public network, and so on.

Figure 2:
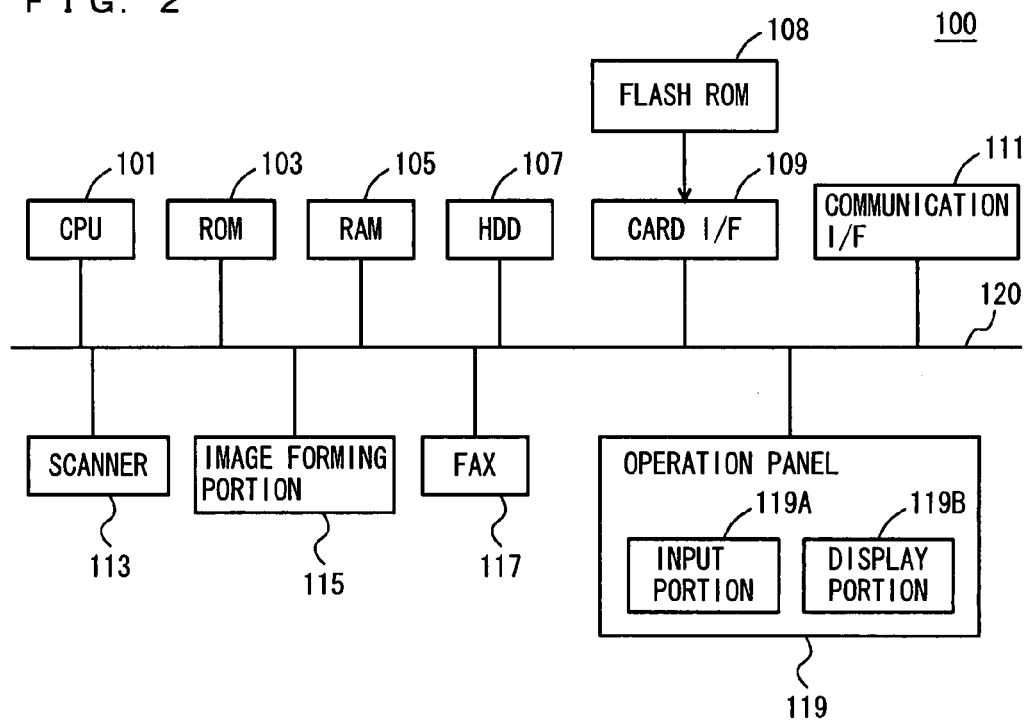
FIG. 2 is a block diagram showing a hardware configuration of MFP in the present embodiment.

FIG. 2 is a block diagram showing a hardware configuration of MFP 100 according to this embodiment. Here, MFPs 100A, 100B, 100C have the same configuration as MFP 100 and therefore a description thereof will not be repeated. With reference to FIG. 2, MFP 100 includes, each connected to a bus 120, a central processing unit (CPU) 101, a ROM (Read Only Memory) 103 that stores a program to be executed by CPU 101 or the like, a RAM (Random Access Memory) 105 for loading a program to be executed and for storing data during execution of the program, a hard disk drive (HDD) 107 for storing data in a nonvolatile manner, a card interface (I/F) 109 to which a flash ROM 108 is attached, a communication I/F 111 for connecting MFP 100 to network 2, a scanner 113, an image forming portion 115, a facsimile (FAX) 117, and an operation panel 119 as an interface with a user.

HDD 107 includes a plurality of storage regions. Each of a plurality of storage regions is referred to as a BOX here. BOX includes a personal BOX and a group BOX. The personal BOX is a storage region allocated to each of a plurality of users who are registered as users using MFP 100. The group BOX is a storage region allocated to two or more users of a plurality of users. Each of the personal BOX and the group BOX can be accessed only by a user registered therein. Alternatively, access from a user other than the registered users may be restricted in some way.

CPU 101 loads into RAM 105 and executes a data processing program stored in flash ROM 108 attached to card I/F 109. Moreover, the program executed by CPU 101 is not limited to the data processing program stored in flash ROM 108, and a program stored in an EEPROM (Electrically Erasable/Programmable ROM) connected additionally to CPU 101 can be loaded into RAM 105 and be executed. The use of an EEPROM makes it possible to rewrite or additionally write a data processing program. Thus, PC 200 connected to network 2 can rewrite the data processing program stored in the EEPROM of MFP 100 or additionally write a new data processing program. Furthermore, MFP 100 may download a data processing program from another computer connected to the Internet and store that data processing program into EEPROM. Furthermore, CPU 101 may load a data processing program stored in HDD 107 into RAM 105 for execution.

The program referred to here includes not only a program directly executable by CPU 101 but also a source program, a compressed program, an encrypted program, and the like.

Image forming portion 115 is a laser printer, an ink jet printer, or the like, which forms an image based on image data and makes image data visible on recording media such as a sheet of paper. Scanner 113 includes a photoelectric transducer such as a CCD (Charge Coupled Device) and the like, which optically reads a sheet of original manuscript and outputs electronic data as image data. FAX 117 transmits and receives the image data via a public telephone line according to a facsimile standard.

Operation panel 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided to overlap display portion 119B so that an instruction to a button displayed on display portion 119B can be detected. Thus, a variety of operations can be input.

Communication I/F 111 is a communication interface for connecting MFP 100 to network 2. Thus, MFP 100 can communicate with other MFPs 100A, 100B, 100C and PC 200. Although MFP 100 is connected to other MFPs 100A, 100B, 100C and PC 200 via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is input; (2) when image data is received from another computer or from other MFPs 100A, 100B, and 100C connected to network 2 via communication I/F; (3) when image data stored in flash ROM 108 is read via card I/F; and (4) when facsimile data is received in FAX 117. Data input to MFP 100 is given a file name and temporarily stored in a prescribed region of HDD 107.

The output of data from MFP 100 includes the following cases: data stored in HDD 107 is (1) visualized on a recording medium such as paper by image forming portion 115; (2) transmitted to another computer or to other MFPs 100A, 100B, and 100C connected to the network via communication I/F 111; (3) stored in flash ROM 108; (4) output as facsimile data by FAX 117; and (5) displayed on display portion 119B.

Moreover, a storage medium that stores a data processing program is not limited to flash ROM 108 and can also be media that fixedly carries the program, such as a flexible disk, a cassette tape, an optical disk (MO (Magnetic Optical Disc)/MD (Mini Disc)/DVD (Digital Versatile Disc)), an IC card, an optical card, and a semiconductor memory such as a mask ROM, an EPROM, and an EEPROM.

Figure 3:
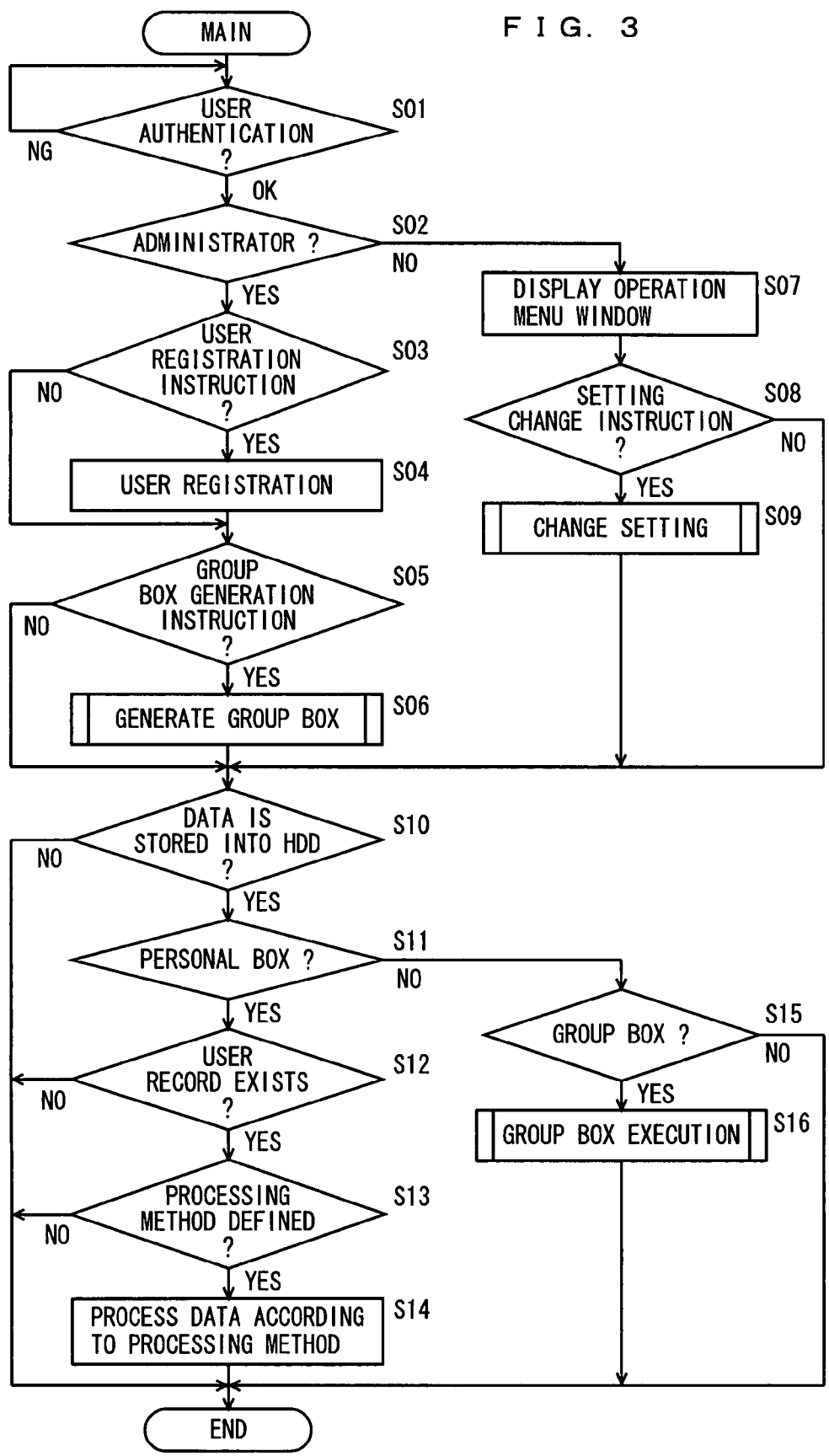
FIG. 3 is a flowchart illustrating a flow of a process performed in MFP.

FIG. 3 is a flowchart illustrating a flow of a process performed in a MFP. The main process shown in FIG. 3 is a process performed by CPU 101 when CPU 101 executes a data processing program stored in flash ROM 108. Referring to FIG. 3, CPU 101 performs user authentication (step S01). The process is on standby until the user authentication is successful (NG at step S01), and if successful, the process proceeds to step S02. MFP 100 accepts user identification information and a password input by the user to input portion 119A and performs authentication based on the accepted identification information and password. MFP 100 stores a user table in HDD 107 beforehand, which will be described later, and determines whether or not there exists user data including a pair of user identification information and password accepted by input portion 119A. If there exists user data including a pair of user identification information and password accepted by input portion 119A, the user is authenticated, and if not, the user is not authenticated. The user who succeeds in authentication will be referred to as a login user hereinafter.

At step S02, it is determined whether user identification information of the login user is set as that of the administrator of MFP 100. The user identification information of the administrator is stored beforehand, and if the user identification information accepted at step S01 is identical to the user identification information stored beforehand as the user identification information of the administrator, the process proceeds to step S03. If not, the process proceeds to step S07. Therefore, different processes are performed between a user who is set as an administrator and a user who is not an administrator.

At step S03, it is determined whether or not a user registration instruction to newly register a user who uses MFP 100 is accepted. Specifically, a menu window for the administrator is displayed on display portion 119B. Then, when an instruction to make a choice of giving an instruction for user registration in the menu window is input to input portion 119A, the user registration instruction is accepted from input portion 119A. If the user registration instruction is accepted, the process proceeds to step S04, and if not, step S04 is skipped and the process proceeds to step S05. At step S04, a user registration process is performed. The user registration process, which will be described later, is a process of generating a user record for each of the registered users and adding the user record to the user table.

At step S05, it is determined whether or not a group BOX generation instruction for generating a group BOX is accepted. Specifically, a menu window for the administrator is displayed on display portion 119B. Then, when an instruction to make a choice of giving an instruction to generate a group BOX in the menu window is input to input portion 119A, the instruction to generate a group BOX is accepted from input portion 119A. If the instruction to generate a group BOX is accepted, the process proceeds to step S06, and if not, step S06 is skipped and the process proceeds to step S10. At step S06, a group BOX generation process is performed. The group BOX generation process, which will be described later, is a process of newly generating a group BOX in HDD 107.

On the other hand, in the case where the process proceeds to step S07, the user identification information of the login user who succeeds in authentication is not set as that of the administrator of MFP 100. In this case, an operation menu window prepared for a user other than the administrator is displayed on display portion 119B (step S07). Then, it is determined whether or not a setting change instruction is accepted (step S08). If an instruction to make a choice of giving an instruction for setting change in the operation menu window is input to input portion 119A by the user, the setting change instruction is accepted from input portion 119A. If the setting change instruction is accepted, the process proceeds to step S09. If not, step S09 is skipped and the process proceeds to step S10. At step S09, a setting change process is performed. The setting change process will be described later.

At step S10, it is determined whether or not data is stored into HDD 107. If data is stored in HDD 107, the process proceeds to step S11, and if not, the process ends. At step S11, it is determined whether or not a region of HDD 107 into which the data is stored is a personal BOX. If the data is stored in a personal BOX, the process proceeds to step S12, and if not, the process proceeds to step S15.

At step S12, it is determined whether or not there exists a user record corresponding to the personal BOX into which the data is stored. Specifically, it is determined whether or not there exists in the user table a user record that defines BOX identification information for identifying the personal BOX into which the data is stored. If such a user record exists, the process proceeds to step S13, and if not exist, the process ends. At step S13, it is determined whether or not the user record corresponding to the personal BOX into which the data is stored defines a processing method. If a processing method is defined, the process proceeds to step S14, and if not, the process ends.

At step S14, the data stored in the personal BOX at step S10 is processed according to the processing method defined by the user record, and the process then ends. Accordingly, the data is processed in a processing method preset by a user in the user registration process. For example, if transmission processing via email is defined as a processing method, the user can receive data via email when the data is stored in the personal BOX.

At step S15, it is determined whether or not the region of HDD 107 into which the data is stored is a group BOX. If the data is stored in a group BOX, the process proceeds to step S16, and if not, the process ends. At step S16, a group BOX execution process is performed, and the process then ends. The group BOX execution process will be described later.

Figures 4, 5:
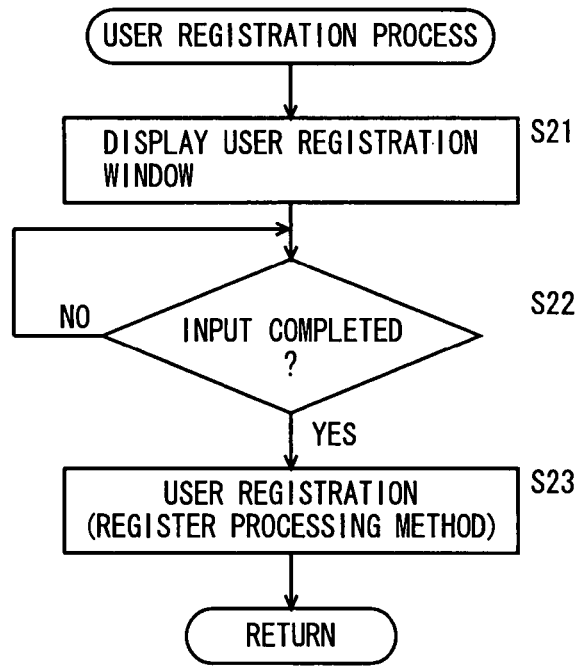
FIG. 4 is a flowchart illustrating a flow of a user registration process.
FIG. 5 shows an exemplary user registration window.

FIG. 4 is a flowchart illustrating a flow of the user registration process. The user registration process is a process performed at step S04 in FIG. 3. Referring to FIG. 4, CPU 101 displays a user registration window on display portion 119B (S21). Then, input is accepted until input of user information is completed (NO at step S22). If an instruction to complete input of user information is input (YES at step S22), the process proceeds to step S23. At step S23, the user is registered. Specifically, a user record is generated according to the user information input according to the user registration window, and the generated user record is added to the user table stored in HDD 107.

In the data processing system in the present embodiment, the user registration process is performed in each of MFPs 100, 100A, 100B, 100C so that a user who mainly uses each MFP is registered. Here, on the basis of a user, MFP 100, 100A, 100B, 100C storing the user information of the user is referred to as a "home apparatus". For example, if user information of a user "David" is stored in MFP 100, the home apparatus for the user "David" is MFP 100. Here, user information is stored in each of MFPs 100, 100A, 100B, 100C in order to define a user who mainly uses the apparatus but not to prohibit the user whose user information is not stored therein from using it.

FIG. 5 shows an exemplary user registration window. Referring to FIG. 5, the user registration window includes a region for inputting user information and a region for inputting a processing method. The region for inputting user information includes a region for inputting a user name, a region for inputting a password, and a region for inputting BOX No. A user name is user identification information for identifying a user. A password is authentication information for use in authentication together with user identification information. BOX No. is BOX identification information for identifying any of a plurality of BOXes in HDD 107. Input of BOX No. allows BOX identified by the BOX No. to be allocated to the user identified by the user identification information.

A processing method defines processing performed on the data stored in the BOX allocated to a user. The processing method includes "print," "mail reception," "FAX reception" and "FTP reception." The region for inputting a processing method includes an item "printing with a designated apparatus" for designating the processing method "print," an item "mail reception" for designating the processing method "mail reception," an item "FAX reception" for designating the processing method "FAX reception," and an item "FTP reception" for designating the processing method "FTP reception." The processing method "print" is designated by designating the item "printing with designated apparatus." The processing method "mail reception" is designated by designating the item "mail reception." The processing method "FAX reception" is designated by designating the item "FAX reception." The processing method "FTP reception" is designated by designating the item "FTP reception." The user may designate any of these processing methods. Here, multiple designation may be permitted.

The processing method "print" defines a process of allowing a designated apparatus to print data stored in a personal BOX. The user registration window includes a region for inputting apparatus identification information for designating an apparatus for printing. If the processing method "print" is designated, the user is requested to input apparatus identification information. In the figure, apparatus identification information "MFP-2" is input which is assigned to MFP 100A. The processing method "mail reception" defines a process of transmitting data stored in a personal BOX via email. The user registration window includes a region for inputting an email address for designating a destination of an email. If the processing method "mail reception" is designated, the user is requested to input an email address. The processing method "FAX reception" defines a process of transmitting data stored in a personal BOX via facsimile. The user registration window includes a region for inputting a facsimile number for designating a facsimile machine which receives facsimile. If the processing method "FAX reception" is designated, the user is requested to input a facsimile number. The processing method "FTP reception" defines a process of transmitting data stored in a personal BOX via FTP (File Transfer Protocol). The user registration window includes a region for inputting an IP address of a receiving apparatus and a storage location for designating a destination which receives data via FTP.

FIG. 6A shows an exemplary user table stored in MFP 100, FIG. 6B shows an exemplary user table stored in MFP 100A, FIG. 6C shows an exemplary user table stored in MFP 100B, and FIG. 6D shows an exemplary user table stored in MFP 100C. A user table includes at least one user record which defines a combination of user identification information, a password, BOX identification information and a processing method. Here, accompanying information related to a user may be included. The accompanying information is information related to the user, such as an email address allocated to the user or face image data obtained by picking up an image of the user. The authentication information is information for use in user authentication at the time of login, and here, a password is used. Face image data may be used for authentication information. When biometrics authentication is used, a fingerprint, sound spectrogram, iris, vein pattern, and the like are used for authentication information.

The processing method includes any of "print," "mail reception," "FAX reception," and "FTP reception," or a combination thereof. In the case of "print," the processing method includes apparatus identification information. In the case of "FAX reception," the processing method includes a facsimile number. In the case of "mail reception," the processing method includes an email address of a recipient. In the case of "FTP reception," the processing method includes an IP address allocated to an apparatus which receives data via FTP and location information for storing data, for example, URL.

Figure 7:
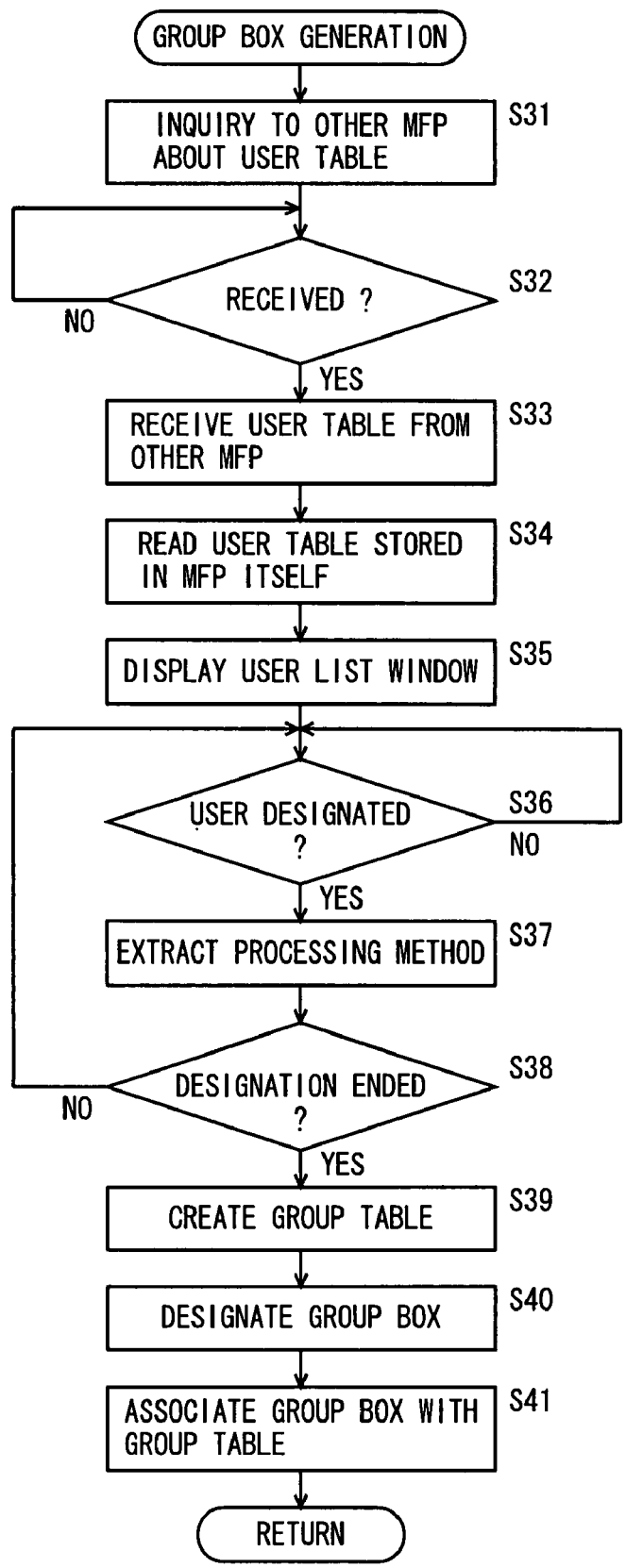
FIG. 7 is a flowchart illustrating an exemplary flow of a group BOX generation process.

FIG. 7 is a flowchart illustrating an exemplary flow of the group BOX generation process. The group BOX generation process is a process performed at step S06 in FIG. 3. Referring to FIG. 7, CPU 101 makes an inquiry for requesting other MFPs 100A, 100B, 100C to transmit a user table stored by each of them (step S31). This is to allow a user registered in other MFPs 100A, 100B, 100C to be incorporated into the same group with a user registered in MFP 100. In response to this inquiry, each of other MFPs 100A, 100B, 100C transmits a user table stored in its HDD 107 to MFP 100. At step S32, reception of a user table is awaited (NO at step S32), and when a user table is received, the process proceeds to step S33.

At step S33, a user table is received. Here, it is assumed that user tables are received from all of other MFPs 100A, 100B, 100C. Here, the apparatus identification information of MFP that has transmitted the user table is received together with the user table, so that it can be known which of MFPs 100A, 100B, 100C has transmitted the user table. Therefore, the received user table may be managed together with the apparatus identification information for identifying MFP that has transmitted the same.

At step S34, the user table stored in MFP 100 is read from HDD 107. Then, a user list window is displayed on display portion 119B (step S35). The user list window is a window which displays a list created by extracting a plurality of user identification information from all the user records included in each of the user table received at step S33 and the user table read at step S34.

Then, the process is on standby until designation of user identification information to be incorporated into the group, among the user identification information displayed in the user list window, is accepted (NO at step S36). If designation is accepted, the process proceeds to step S37. At step S37, a processing method defined by the user record including the designated user identification information is extracted. Then, it is determined whether or not designation of user identification information is ended (step S38). When the user presses a button provided on input portion 119A for giving an instruction to end the designation, the instruction to end the designation is accepted from input portion 119A. If the instruction to end the designation is accepted, the process proceeds to step S39, but if not, the process returns to step S36. If a plurality of user identification information is designated, the users identified by the designated plurality of user identification information are allocated to the same group.

At step S39, a group table is created. The group table includes a group record including a combination of user identification information designated at step S36 and the processing method extracted at step S37.

At the next step S40, designation of a group BOX is accepted. BOX No. for identifying one of a plurality of BOXes stored in HDD 107 is accepted. Then, the BOX having BOX No. designated as a group BOX is associated with the group table (step S41). Specifically, the group table is stored in the group BOX. Accordingly, a processing method corresponding to the user identification information associated with a personal BOX by the user record is obtained and then associated with the group BOX, so that association of a processing method with a group BOX can be established easily. Here, if a processing method corresponding to user identification information is not defined in a user record, a user such as an administrator manually sets a processing method to establish association. Alternatively, irrespective of whether a processing method corresponding to user identification information is defined in a user record or not, a user such as an administrator may manually set a processing method for all the user identification information.

Figures 8, 9:
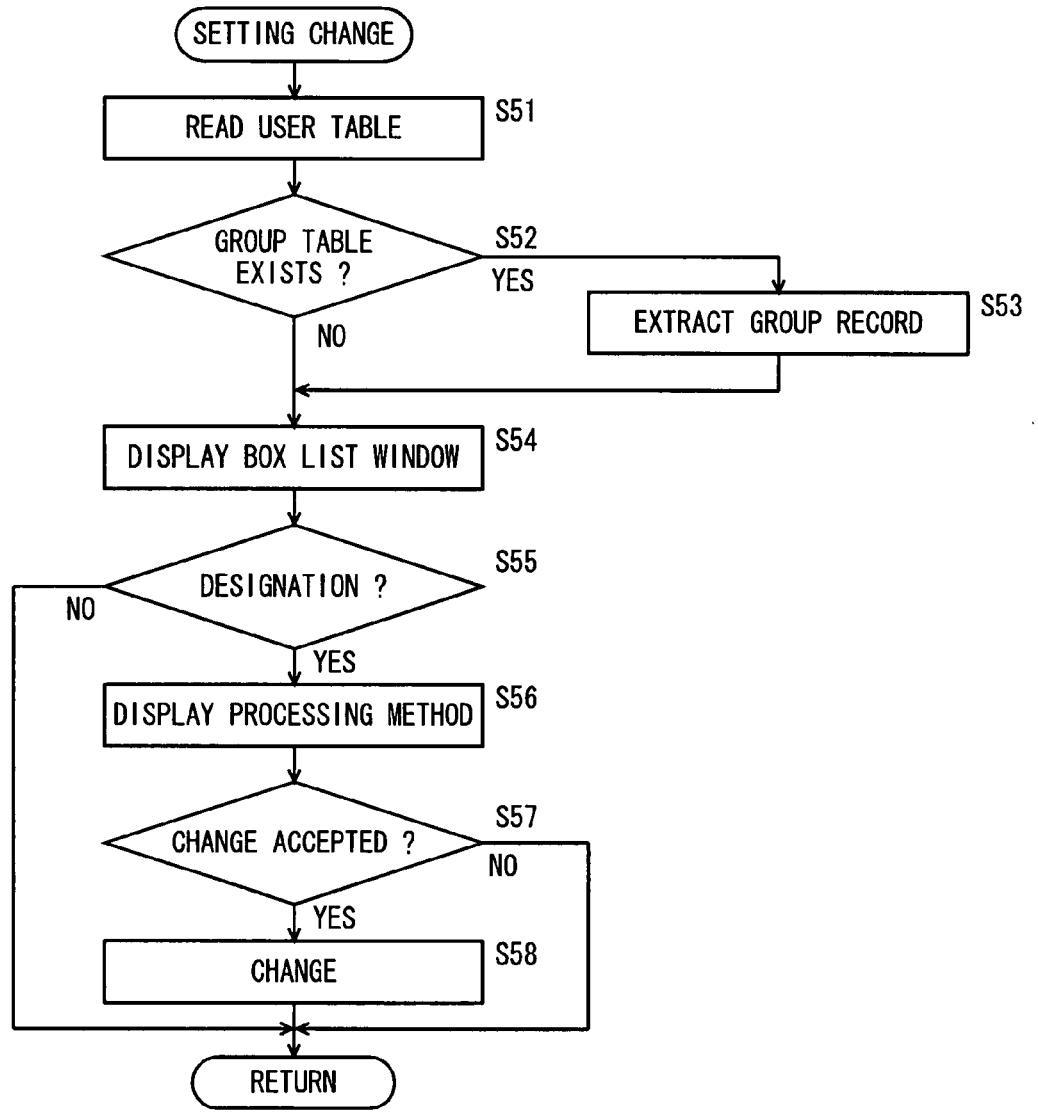
FIG. 8 shows an exemplary group table.
FIG. 9 is a flowchart illustrating an exemplary flow of a setting changing process.

FIG. 8 shows an exemplary group table. The group table shown here is generated when all of the users registered in each of MFPs 100, 100A, 100B, 100C as registered users are allocated to the same one group. Referring to FIG. 8, the group table includes a plurality of group records, each comprised of a combination of user identification information and a processing method.

FIG. 9 is a flowchart illustrating an exemplary flow of the setting change process. The setting change process is a process performed at step S09 in FIG. 3. Referring to FIG. 9, CPU 101 reads the user table stored in HDD 107 (step S51). Then, it is determined whether or not a group table is stored in HDD 107 (step S52). If a group table is stored, the process proceeds to step S53, and if not stored, step S53 is skipped and the process proceeds to step S54. At step S53, the group table is read and a group record is extracted. If a plurality of group tables exist, a plurality of group tables are read, and all the group records are extracted from each of the read group tables.

Then, a box list window is displayed on display portion 119B (step S54). The box list window is a window displaying a list of BOX identification information of BOX related to the login user. The BOX related to the login user includes a personal BOX allocated to the login user and a group BOX allocated to the group to which the login user belongs. The BOX identification information defined by the user record including the user identification information of the login user, of the user records included in the user table read at step S51, and the BOX identification information of the group BOX defined by the group record including the user identification information of the login user, of the group records extracted at step S53 are obtained and displayed in the list.

Then, it is determined whether or not any of BOX identification information displayed in the box list window is designated (step S55). If designated, the process proceeds to step S56, and if not, the process returns to the main process.

At step S56, the processing method set for the login user in the designated BOX is displayed on display portion 119B. Specifically, if a BOX name of a personal BOX is designated, a processing method defined by the user record including the user identification information of the login user, of the user records included in the user table read at step S51, is displayed. If BOX identification information of a group BOX is designated, a processing method defined by the group record including the user identification information of the login user, of a plurality of group records included in the group table associated with the BOX having the designated BOX identification information, is displayed.

At the next step S57, it is determined whether or not a change of a processing method is accepted. If a change of a processing method is accepted, the process proceeds to step S58, and if not, step S58 is skipped and the process returns to the main process. At step S58, update is performed with the changed processing method, and the process returns to the main process. Specifically, at step S55, if BOX identification information of a personal BOX is designated, the processing method defined by the user record is updated with the changed processing method. On the other hand, at step S55, if BOX identification information of a group BOX is designated, the processing method defined by the group record is updated with the changed processing method. Therefore, different processes can be performed between when data is stored in a personal BOX and when data is stored in a group BOX.

Figure 10:
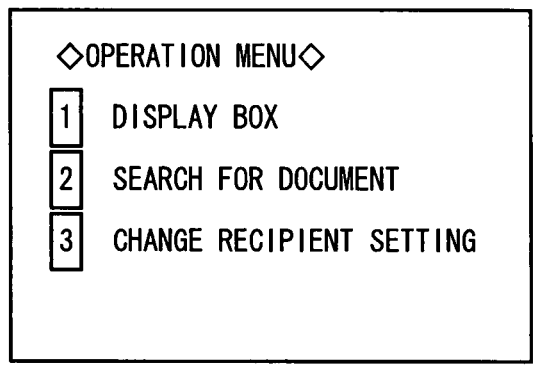
FIG. 10 shows an exemplary operation menu window.

FIG. 10 shows an exemplary operation menu window. The operation menu window is a window displayed on display portion 119B when authentication of a user who is not an administrator is successful in the main process (NO at step S02 in FIG. 3). Referring to FIG. 10, the operation menu window includes a choice represented by "display BOX" for inputting an instruction to display contents of BOX, a choice represented by "search for document" for inputting an instruction to conduct a search for a document, and a choice represented by "change of recipient settings" for inputting an instruction for setting change. If the choice represented by "change of recipient settings" is designated, an instruction for setting change is accepted and the BOX list display window is displayed.

Figure 11:
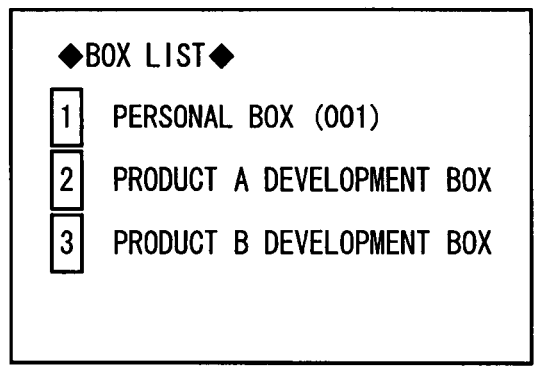
FIG. 11 shows an exemplary BOX list display window.

FIG. 11 shows an exemplary BOX list display window. Referring to FIG. 11, the BOX list display window includes a choice represented by "personal BOX" for giving an instruction to change settings of the personal BOX of the login user, a choice represented by "Product A development BOX" for giving an instruction to change settings of one group BOX of the group including the login user, and a choice represented by "Product B development BOX" for giving an instruction to change settings of another group BOX of the group including the login user. Here, the login user belongs to two groups, by way of example. The settings corresponding to the respective group BOXes of the two groups can be changed separately. When any of the choices is designated, a recipient settings display window appears to display the settings corresponding to the BOX.

Figure 12:
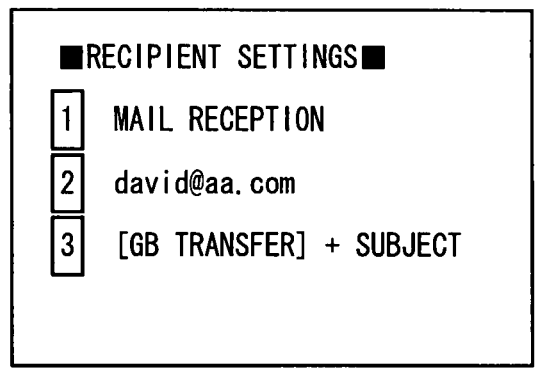
FIG. 12 is a first diagram showing an exemplary recipient settings display window.

FIG. 12 is a first diagram showing an exemplary recipient settings display window. The recipient settings display window shown here is displayed when the choice "Product A development BOX" is designated from the two group BOX choices. Referring to FIG. 12, the recipient settings display window includes a processing method, a parameter and a display setting. "Mail reception" is displayed as a processing method, indicating that a processing method "mail reception" is set among a plurality of processing methods. The parameter is a parameter required to execute a process by a processing method. Here, an email address required to transmit an email in the processing method "mail reception" is set as a parameter. The display setting is a subject which is recorded in an output medium when a process is executed by a processing method. Here, "[GB transfer]+subject" is shown as a character string to be displayed as a subject of an email. The subject is, for example, a file name of data stored in a group BOX.

Accordingly, when receiving an email, the recipient user can be notified of which BOX the data attached to the email is stored in and, in addition, the file name of the data.

Figure 13:
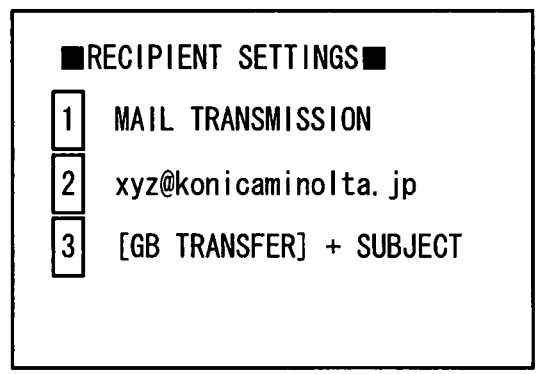
FIG. 13 is a second diagram showing an exemplary recipient settings display window.

FIG. 13 is a second diagram showing an exemplary recipient settings display window. The recipient settings display window shown in FIG. 13 is displayed after the settings displayed in the recipient settings display window shown in FIG. 12 is changed. Referring to FIG. 12 and FIG. 13, the parameter has been changed. In this manner, the settings can be changed, and therefore data can be received in a different processing method for each group BOX or personal BOX.

Figure 14:
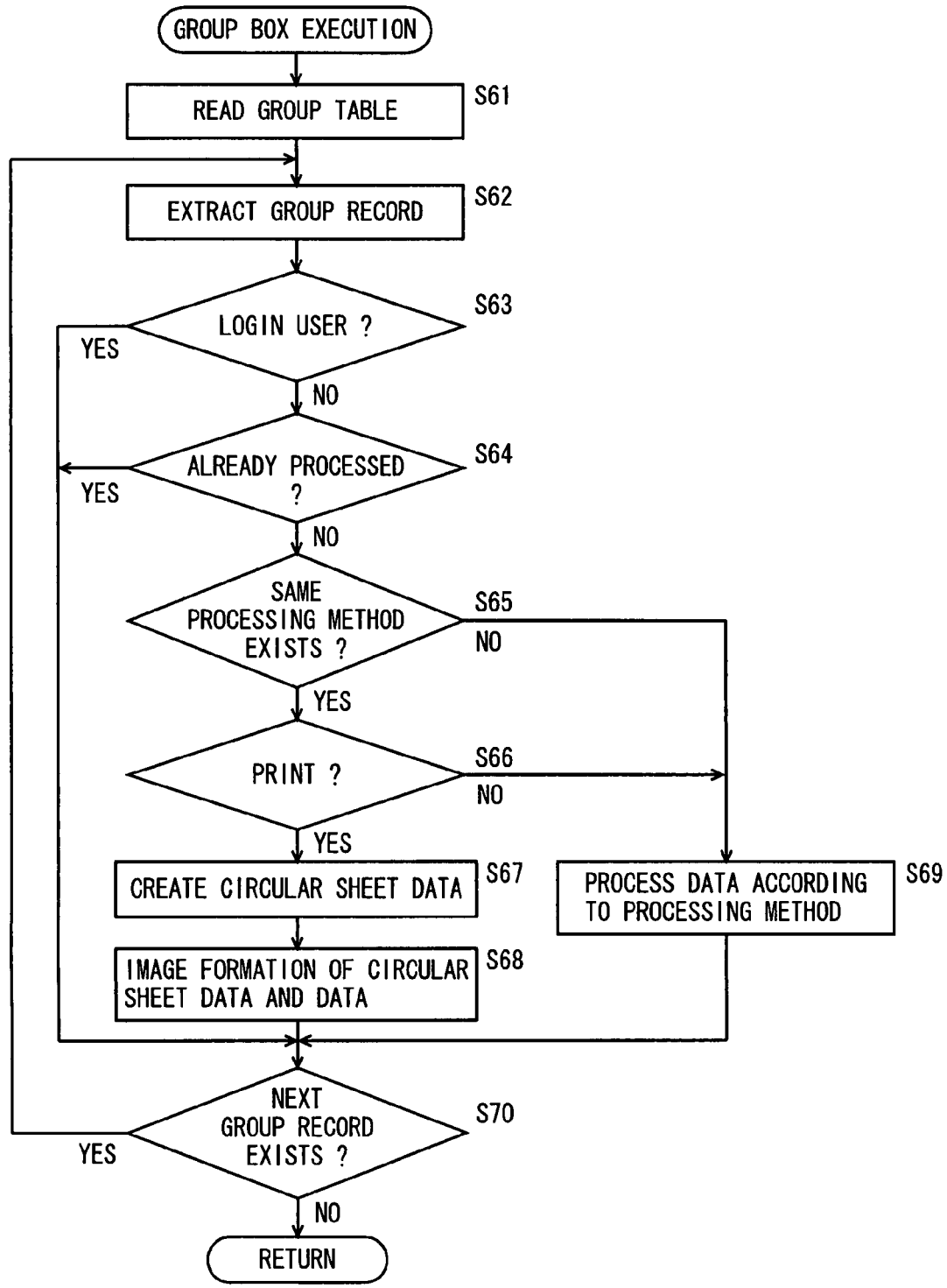
FIG. 14 is a flowchart illustrating an exemplary flow of a group BOX execution process.

FIG. 14 is a flowchart illustrating an exemplary flow of the group BOX execution process. The group BOX execution process is a process performed at step S16 in FIG. 3. The group BOX execution process is performed in the case where data is stored in a group BOX. Referring to FIG. 14, CPU 101 reads a group table stored in the group BOX into which data is stored (step S61). Then, one of a plurality of group records included in the group table is extracted as a process target (step S62). Then, it is determined whether or not the extracted group record corresponds to the login user (step S63). It is determined whether or not the user identification information included in the extracted group record is identical to the user identification information of the login user. If they are identical, it is determined that the group record corresponds to the login user, and the process proceeds to step S70. If they are not identical, the process proceeds to step S64. If the group record corresponds to the login user, the process at step S64-step S69 is not performed so that the data stored by the login user is not processed by the processing method set for that user. In other words, the user (login user) who performs an operation of storing data in HDD 107 at step S10 in FIG. 3 is prohibited from processing data according to the processing method corresponding to that user. This is because it is unnecessary to perform, for example, a process of transmitting data to the user who himself stores the data.

At step S64, it is determined whether or not the process has already been executed by the processing method defined by the extracted group record. If already executed, the process proceeds to step S70, and if not, the process proceeds to step S65. At the following step S66-step S68, as for the print processing method, if there are a plurality of group records that define the same processing method, printing is done only once rather than printings are done by a number of group records. Therefore, in some cases, the process has already been executed by the processing method defined by the group record extracted at step S62. Therefore, at step S64, it is determined whether or not the process has already been executed by the processing method defined by the extracted group record, and if executed, the process proceeds to step S70. Accordingly, the same process is not repeatedly executed.

At step S65, it is determined whether or not there exists a group record that defines the same processing method, among the group records that have not yet been extracted. If there exists a group record that defines the same processing method, such a group record is extracted, and then the process proceeds to step S66. If not, the process proceeds to step S69.

At step S66, it is determined whether or not the processing method is print. If the processing method is print, the process proceeds to step S67, and if not, the process proceeds to step S69. At step S67, circular sheet data is created. The circular sheet data includes user identification information defined by each of a plurality of group records extracted as the group records that define the same processing content at step S65. The circular sheet data is created for printing user identification information of a plurality of users for whom the print processing method is set. Then, based on the circular sheet data and the data stored at step S10 in FIG. 3, an image is formed (step S68), and the process proceeds to step S70. A circular sheet having an image formed thereon based on the circular sheet data and a sheet of paper having an image formed thereon based on the data are output. The circular sheet has user identification information printed thereon to indicate the user who requires the sheet of paper having the image of the data formed thereon. Therefore, the number of sheets printed can be reduced. Here, the process at steps S66-S68 may not be performed and the process may be executed for each user identification information even in the case of print.

On the other hand, at step S69, the stored data is processed by the processing method defined by the group record extracted at step S62, and the process proceeds to step S70. At step S70, it is determined whether or not there exits a group record that has not yet been extracted. If such a group record exists, the process returns to step S62, and if not exist, the process returns to the main process.

As described above, MFP 100 serving as a data processing apparatus in the present embodiment includes HDD 107 having a plurality of BOXes for storing data, and stores a user table including a plurality of user records each defining, for each of a plurality of users, user identification information for identifying the user and a data processing method. Then, a group table is created which includes at least two processing methods respectively defined by at least two of a plurality of user records and defines association of the at least two processing methods with a group BOX among a plurality of BOXes. Then, when data is stored in the group BOX, the data is processed according to the at least two processing methods associated with the group BOX by the group table. Therefore, an operation of storing data into the group BOX allows the data to be processed by each of a plurality of processing methods defined for each of a plurality of users.

In addition, each of a plurality of user records is related with a personal BOX selected from a plurality of BOXes. Then, when data is stored in a personal BOX, the data is processed according to the processing method defined by the user record related with that personal BOX. A plurality of user identification information respectively defined by a plurality of user records are displayed, and when at least two designations are accepted among the displayed plurality of user identification information, a group table is created with a processing method associated with the user identification information. Therefore, the processing method for creating a group table can be designated from the user record, so that the group table can be created easily.

Furthermore, when user identification information is accepted and authentication is successful, it becomes possible to change a processing method defined by the group record including the accepted user identification information, of the group records included in the group table. Therefore, different processes can be performed between when data is stored in a group BOX and when data is stored in a personal BOX.

In addition, when data is stored in a group BOX after user identification information is accepted and authentication is successful, the process is not performed according to the processing method defined by the group record including the authenticated user identification information, of the group records included in the group table. Therefore, execution of any unnecessary process can be prevented.

Although in the foregoing embodiment, MFP 100 has been illustrated as an exemplary data processing apparatus, it is needless to say that the present invention can be understood as a data processing method or a data processing program for causing a computer to perform the process shown in FIG. 3, FIG. 4, FIG. 7, FIG. 9 and FIG. 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus comprising:
   a data storage portion having a group storage region for storing data, the data storage portion being related with at least two users;
   a group association portion to associate at least one respective data processing method that is different for each of said at least two users relating to said group storage region; and
   a group processing portion to process data according to the at least one respective data processing method for each of said at least two users associated with said group storage region, in response to said data being stored into the group storage region.

2. The data processing apparatus according to claim 1, wherein
   said data storage portion additionally has a personal storage region for storing data, which is related with only one user, and
   if a user related with said group storage region is also related with said personal storage region, said group association portion obtains a data processing method corresponding to the user associated with said personal storage region and associates the obtained data processing method with said group storage region.

3. The data processing apparatus according to claim 1, further comprising a change portion to change said data processing method associated with said group storage region according to an instruction from a user corresponding to the data processing method.

4. The data processing apparatus according to claim 1, wherein if any one of the at least two users related with said group storage region stores data into said group storage region, said group processing portion prohibits said stored data from being processed according to the at least one data processing method corresponding to each of the at least two users.

5. The data processing apparatus according to claim 1, further comprising an image forming portion to print an image based on data, wherein
   if there exist a plurality of users for whom print is defined as said data processing method, said group processing portion executes printing of said data only once and, in addition, prints user identification information for identifying a plurality of users for whom print is defined as said data processing method.

6. A data processing method performed in a computer including a data storage portion having a group storage region for storing data, which is related with at least two users, comprising the steps of:
   associating at least one respective data processing method that is different for each of said at least two users relating to said group storage region; and
   in response to data being stored into said group storage region, processing said stored data according to the at least one data processing method for each of said at least two users associated with the storage region.

7. The data processing method according to claim 6, wherein
   said data storage portion additionally has a personal storage region for storing data, which is related with only one user, and
   if a user related with said group storage region is also related with said personal storage region, said associating step includes the step of obtaining a data processing method corresponding to the user associated with said personal storage region and associating the obtained data processing method with said group storage region.

8. The data processing method according to claim 6, further comprising the step of changing said data processing method associated with said group storage region according to an instruction from a user corresponding to the data processing method.

9. The data processing method according to claim 6, wherein if any one of the at least two users related with said group storage region stores data into said group storage region, said processing step includes the step of prohibiting said stored data from being processed according to the at least one data processing method corresponding to each of the at least two users.

10. The data processing method according to claim 6, wherein
    if there exist a plurality of users for whom print is defined as said data processing method, said processing step includes the step of executing printing of said data only once and, in addition, printing user identification information for identifying a plurality of users for whom print is defined as said data processing method.

11. A non-transitory computer readable medium storing a data processing program for causing a computer including a data storage portion having a group storage region for storing data, which is related with at least two users, to execute the steps of:
    associating at least one respective data processing method that is different for each of said at least two users related with said group storage region; and
    in response to data being stored into said group storage region, processing said stored data according to said at least one data processing method for each of said at least two users associated with the storage region.

12. The non-transitory computer readable medium according to claim 11, wherein
    said data storage portion additionally has a personal storage region for storing data, which is related with only one user, and
    if a user related with said group storage region is also related with said personal storage region, said associating step includes the step of obtaining a data processing method corresponding to the user associated with said personal storage region and associating the obtained data processing method with said group storage region.

13. The non-transitory computer readable medium according to claim 11, further causing said computer to execute the step of changing said data processing method associated with said group storage region according to an instruction from a user corresponding to the data processing method.

14. The non-transitory computer readable medium according to claim 11, wherein if any one of the at least two users related with said group storage region stores data into said group storage region, said processing step includes the step of prohibiting said stored data from being processed according to the at least one data processing method corresponding to each of the at least two users.

15. The non-transitory computer readable medium according to claim 11, wherein if there exist a plurality of users for whom print is defined as said data processing method, said processing step includes the step of executing printing of said data only once and, in addition, printing user identification information for identifying a plurality of users for whom print is defined as said data processing method.

* * * * *